F. H. SMITH.
DRYING FRUITS, VEGETABLES, AND MEATS.
No. 4,468. REISSUED JULY 11, 1871.
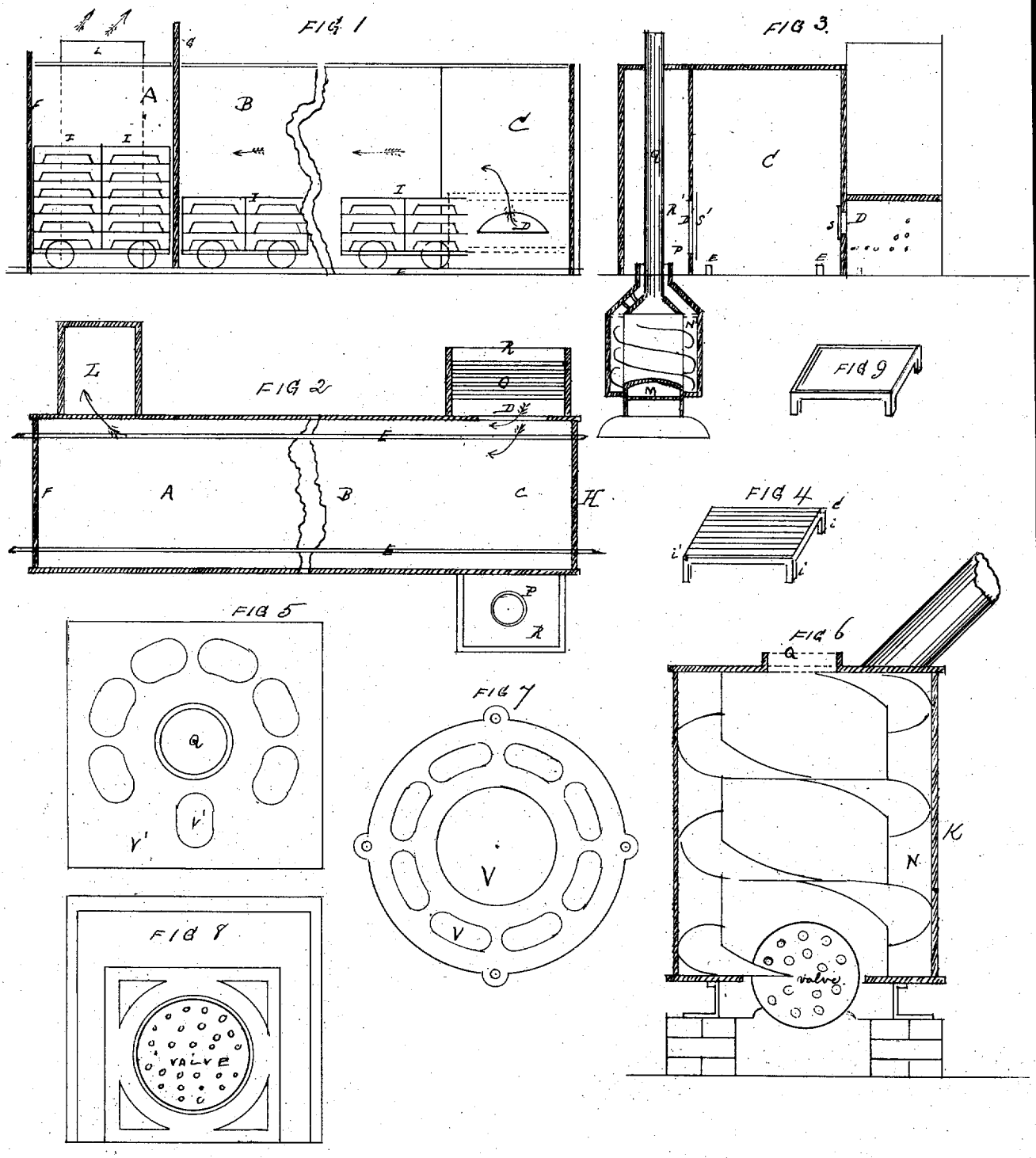
Witnesses
Goodwin Y. Allen
A. E. Beach
Inventor
Francis H. Smith

UNITED STATES PATENT OFFICE.

FRANCIS H. SMITH, OF BALTIMORE, MARYLAND, ASSIGNOR OF ONE-HALF INTEREST TO ISAAC SIMMONS.

IMPROVEMENT IN DRYING FRUITS, VEGETABLES, AND MEATS.

Specification forming part of Letters Patent No. 31,566, dated February 26, 1861; reissue No. 3,017, dated June 30, 1868; reissue No. 4,468, dated July 11, 1871.

*To all whom it may concern:*

Be it known that I, FRANCIS H. SMITH, of the city of Baltimore, county of Baltimore and State of Maryland, did invent a useful Improvement in Drying Fruits, Vegetables, and other substances; and this is hereby declared to be a full, clear, and exact description of the same, reference being had to the accompanying drawing forming a part of this specification, in which drawing—

Figure 1 represents a longitudinal vertical section of an apparatus which may be used in carrying out this invention; Fig. 2, a horizontal, and Fig. 3 a vertical cross-section of the same. Fig. 4 is a perspective view of one of the trays, hereinafter described; Figs. 5, 6, 7, and 8, a furnace for heating air; Fig. 9, same as Fig. 4, for fruit.

Similar letters indicate corresponding parts.

This invention consists in preserving and drying fruits, vegetables, and meats by exposing them to the action of heated air in a chamber so constructed that the article to be dried shall first be subjected to a current of warm air of comparatively low temperature, and subsequently subjected to a gradually-increasing heat, in such a manner that the moisture is rapidly expelled and the natural properties of the substance under treatment are preserved unaltered. The product obtained by this process is far superior in flavor, color, sweetness, and purity to any fruit or vegetable dried in the ordinary manner. The apparatus consists in a tunnel having a furnace, or its equivalent, at the rear end, and a chimney at the front end, in combination with gates, cars, trays, and rails, constructed substantially as and for the purposes hereinafter described. The rails may either be arranged on a level plane or slightly inclined. There is also arranged at one end of the tunnel an improved style of furnace.

The whole apparatus is intended for drying brick, fruit, &c., by means of cars loaded with trays upon which the articles to be dried are piled—the cars traveling through a heated tunnel—and is so arranged that the drying-tunnel and loading of the cars can go on uninterruptedly for any length of time.

To enable others skilled to make and use this apparatus, I will proceed to describe its construction and operation.

A B C represent a tunnel of considerable length, (say one hundred feet,) made of brick-work or other suitable material. The rear and front ends of the tunnel are provided with gates, H and F, which can be closed or opened as may be necessary in the course of the operation. The front portion A of the tunnel may be cut off from the main part of the tunnel by means of a gate, G, which is represented half open in Fig. 1. The section A communicates with a chimney, L, while the rear end C of the tunnel communicates, through an opening, D, with a furnace, R, provided with a suitable grate, O. A railway is composed of rails E E, and is laid on the floor of the tunnel. The plane on which the rails are laid may be level, or, if preferred, slightly inclined from the front toward the rear of the tunnel. A number of cars, enough to fill the whole length of the tunnel, is provided, and are to be loaded, one after the other, with trays I, upon which the articles to be dried are placed. The said trays are constructed as clearly shown in Fig. 4, having each four legs, *i*, fitting in cavities *i'* in the upper corners of the tray below. This construction is needful in order to enable the trays to stand securely in four separate stacks, as represented at I I, Fig. 1, with a space between their edges to facilitate handling.

When the tunnel is used for the purpose of drying fruits and vegetables the style of tray which may be used is shown in Fig. 9. Instead of a flat table-top a ledge, *i i*, is attached, which, for fruit, should be about two inches in height, and for vegetables, such as sweet potatoes, about four inches high.

The first car having been freighted in this manner while in section A of the tunnel, the gate F is shut and gate G is opened, as seen in Fig. 1, and the car is pushed into the main part B of the tunnel, so that the gate G can be shut behind it. The gate F is then opened, the next car is entered into section A, and, after having been freighted in the same manner as the preceding car, the gate G is then again opened and the car is moved forward into section B, pushing the first car forward. The gate G is then again shut, gate F is opened, and the third car is entered and freighted, &c., each car pushing forward the preceding series of cars as it enters the main part B of the tunnel, until the car which has been entered first arrives at the end C of the tunnel. The gate H is then opened as often as a car is entered, in order to allow the last car of the series to pass out of the tunnel. The heated air arising from the furnace R enters through opening D and passes through the whole length of the tunnel, and finally out at the chimney L. From this it will be seen that the substances to be dried enter the tunnel at the end where the temperature is lowest, and are gradually subjected to an increasing heat as they approach the other end of the tunnel, where they finally come in contact with the intense heat arising directly from the furnace. The rails E E may be level or slightly inclined, as shown in Fig. 1, so that the whole series of cars can be pushed along easily by the operator or operators attending the rear end.

The draught caused from the furnace R through the whole length of tunnel toward and out of the chimney L serves to carry the moisture of the drying articles away as fast as it is liberated, by which means the drying process is considerably facilitated.

It will be understood that this apparatus, in its original or in a modified form, will answer for drying various articles, such as, for instance, bricks, tile, pottery, cores for castings, and other manufactures of clay and sand, grain, fruit, vegetables, lumber, glue, starch, whiting, sugar, bagasse, guano, leather, hides, fish, meat, saltpeter, alum, and other chemicals.

What I claim as new, and desire to secure by Letters Patent, is—

1. The process of preserving and drying fruits, vegetables, and meats, by first exposing them to the action of heated air of a comparatively low temperature and subsequently subjecting them to a gradually-increasing heat, substantially as specified.

2. Dried fruit, obtained by exposing fruits to a progressive process, substantially such as herein described.

3. Dried vegetables, obtained by exposing vegetables to a progressive process, substantially such as herein described.

4. Dried meats, obtained by exposing meats to a progressive process, substantially such as herein described.

FRS. H. SMITH. [L. S.]

Witnesses:
JAS. W. KIRMKAN,
MARSHALL P. SMITH.